United States Patent [19]

Le Parquier

[11] 4,001,875
[45] Jan. 4, 1977

[54] RECORDING APPARATUS CODING CIRCUIT FOR AN IMAGE SIGNAL AND CORRESPONDING DECODING CIRCUIT

[75] Inventor: Guy Le Parquier, Paris, France

[73] Assignee: Thomson-CSF, Paris, France

[22] Filed: Aug. 5, 1975

[21] Appl. No.: 602,012

[30] Foreign Application Priority Data

Aug. 9, 1974 France .............................. 74.27763

[52] U.S. Cl. ...................................... 358/4; 358/14
[51] Int. Cl.² ..................... H04N 9/42; H04N 9/02; H04N 5/76
[58] Field of Search ............... 358/4, 12, 14; 360/9, 360/10, 22–24, 27, 33; 178/6.6 R

[56] References Cited

UNITED STATES PATENTS

| 2,236,502 | 4/1941 | Goldsmith | 178/DIG. 3 |
| 2,696,523 | 12/1954 | Theile | 178/6.5 |
| 2,734,937 | 2/1956 | Beste | 358/12 |
| 3,392,233 | 7/1968 | Houghton | 178/DIG. 3 |
| 3,456,071 | 7/1969 | Jackson et al. | 178/DIG. 23 |
| 3,869,706 | 3/1975 | Peltier | 358/12 |

OTHER PUBLICATIONS

Noll, *Television For Radiomen*, The MacMillan Company, New York, 1955, pp. 224–227.

*Primary Examiner*—John C. Martin
*Attorney, Agent, or Firm*—Cushman, Darby & Cushman

[57] ABSTRACT

The image signal is divided into first and second component signals respectively occupying a lower and a higher frequency band, and the second component signal is translated into the lower frequency band by means of a modulator fed by an oscillator, after which the two component signals are alternately directed, each for the duration of a frame period, to the output of the circuit, bursts of the output signal from the oscillator being added, during the horizontal fly-back intervals, to the frequency translated signal. In the decoding circuit, which is designed to simultaneously receive the signals derived from two reading units, the second of which delivers the recorded signal time shifted by a frame period relatively to the other, the second component signal is retranslated into the higher frequency band by a modulator fed by an oscillator synchronised by mean of the recorded bursts.

8 Claims, 5 Drawing Figures

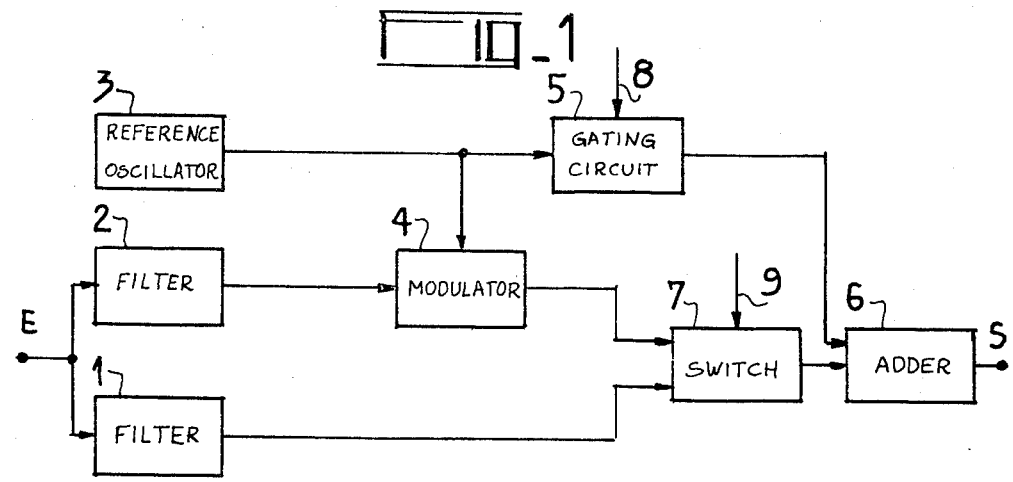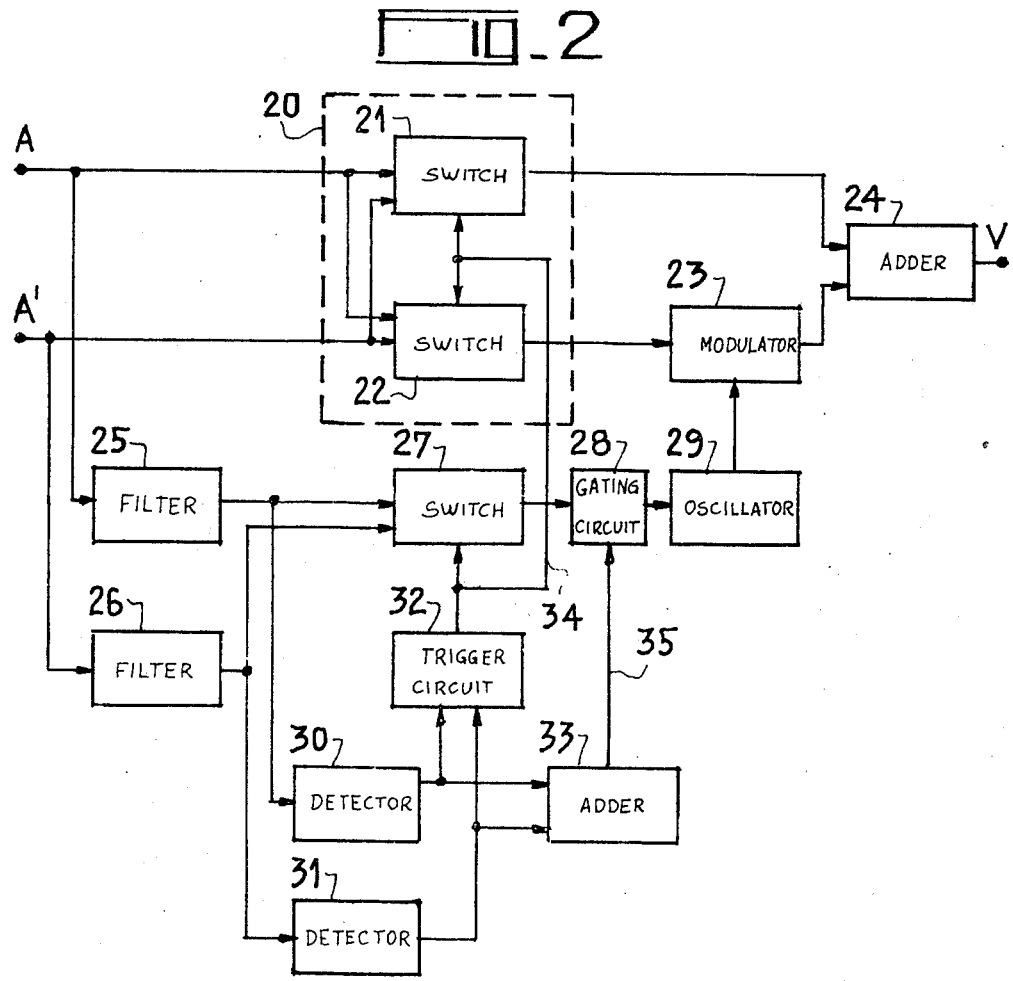

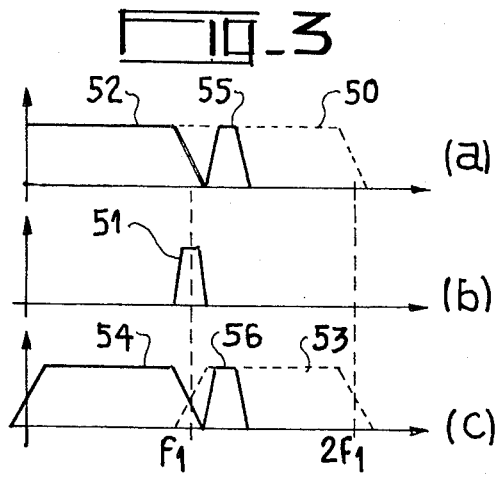
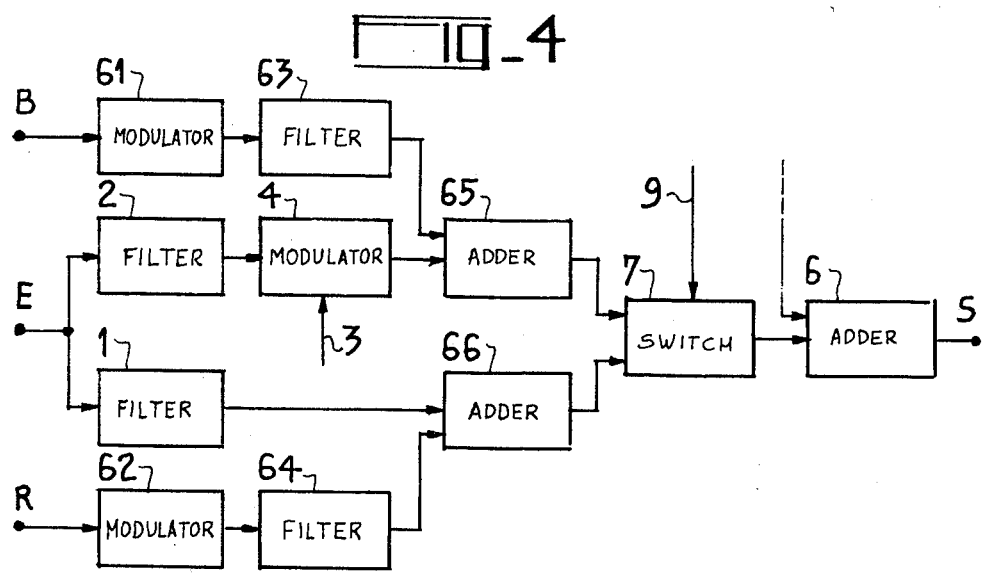
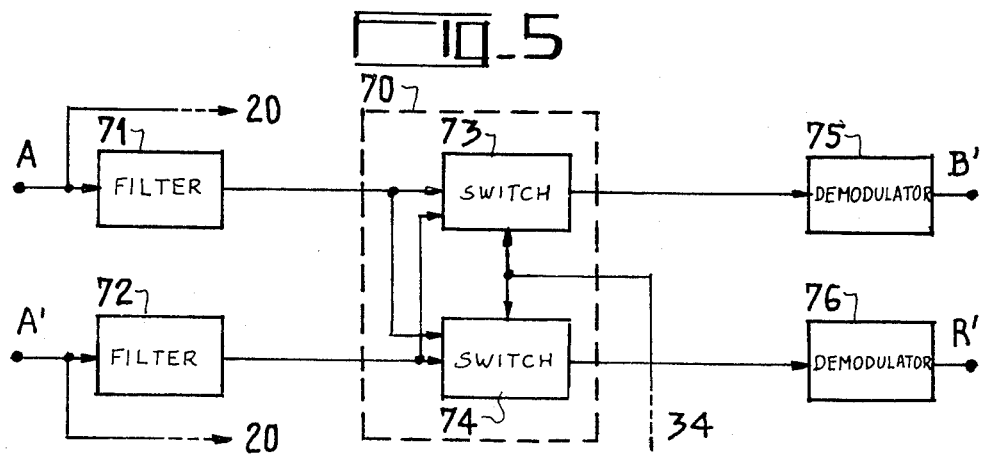

RECORDING APPARATUS CODING CIRCUIT FOR AN IMAGE SIGNAL AND CORRESPONDING DECODING CIRCUIT

The present invention has for its object a recording apparatus coding circuit for processing a television image signal, before recording the same, whether in the form of the processed signal or in the form of a wave modulated by the processed signal.

The invention has also for its object a corresponding reproducing apparatus decoding circuit for deriving a television image signal from the processed signal.

The coding and decoding circuits may for example be parts of a magnetoscope.

The coding circuit may also be used for recording an image signal on a video disc, the decoding circuit being then part of the fly-back apparatus of those buying the disc.

Coding and decoding circuits have been proposed, which take advantage of the memory formed by the recording medium for reducing the quantity of information to be recorded through dividing the image signal into two component signals occupying two contiguous frequency bands and alternately recording the information contained in those two component signals.

Two successively recorded signals are read simultaneously for restoring the image signal.

Circuits of this type, where the alternation occurs at the frame, field or line frequency, have been described in French Pats. Nos. 1,490,398 and 1,454,578.

In the former, the two signals, whose respective bandwidths are not indicated, are alternately recorded as such. This does not afford any gain as concerns the overall width of the spectrum to be recorded.

In French Pat. No. 1,454,578, the first component signal occupies the lower frequency band, which is much narrower than the upper frequency band, and is recorded in the form of a frequency-modulated wave while the second component signal is recorded as such. This hybrid system does not allow the same quality of reproduction for both component signals.

Neither of those coding circuits is adapted to the systems where the recording is always in the form of a frequency-modulated wave, as is normally the case for video-discs, or where a high standard magnetoscope is used.

According to the invention there is provided a recording apparatus coding circuit for processing a television image signal before the recording thereof, said coding circuit comprising: filtering means for separating said image signal into first and second component signals respectively occupying a lower frequency band and a higher frequency band, said lower and higher frequency bands having equal widths; frequency translating means, including a modulator and an oscillator for translating said second component signal into said lower frequency band; switching means for alternately directing to a single output said first component signal and the frequency translated second component signal; and means for adding bursts of the output signal from said oscillator to said frequency-translated second component signal during the horizontal fly-back intervals, the signal formed by the alternation of said first component signal and said frequency-translated second component signals with said burst being hereinafter referred to as the "alternate signal".

According to the invention there is further provided a reproducing apparatus decoding circuit for processing an alternate signal formed by means of coding circuit as defined herenabove, said decoding circuit comprising; a double switch having two inputs for simultaneously receiving said alternate signal, the alternate signal applied to one of said two inputs being time-shifted relatively to the other one of said inputs, and two outputs; means for actuating said double switch to direct said first component signal and said frequency translated second component signal to said two outputs of said double switch, respectively; and frequency translating means for translating said frequency translated second component signal into said lower frequency band, said frequency translating means including a modulator and oscillator having a control input, and means for applying said bursts to said control input of said oscillator.

Whether the alternate signals is recorded as such or in the form of a frequency-modulated wave the necessary band width is halved.

The invention will be better understood and other of its features rendered apparent, from a consideration of the ensuing description and the related drawings in which:

FIG. 1 is a block diagram of a coding circuit in accordance with the invention;

FIG. 2 is the block diagram of a corresponding a decoding circuit;

FIG. 3 is a diagram explaining the principle of a coding circuit for processing two chrominance signals in addition to a luminance signal;

FIG. 4 is a block diagram of a corresponding coding circuit;

FIG. 5 is a partial diagram of a corresponding decoding circuit.

The adding circuit shown in FIG. 1 is supplied at its input E with a black and white television signal, including the sync signals, and supplies at its output S a signal to be recorded or to be used for frequency modulating a wave to be recorded.

The coding circuit comprises two transmission channels, each channel containing a band-pass filter at the input, whose pass-band corresponds to one of the halves of the range of frequencies by the image signal; the lower frequency spectral components of the image signal, that is to say those whose frequencies are less than a frequency $f$, are transmitted by the filter 1 and the first channel; the higher frequency components of the image signal, that is to say those whose frequencies are comprised between $f$ and $2f$, are transmitted by the filter 2 and the second channel.

The output of the filter 1 supplies one of the inputs of a switch 7 whose output is connected to the output S of the circuit through an amplifier-adder 6. The output of the filter 2 supplies the modulating input of a modulator 4 of single side-band (SSB) type, which is supplied at its second input with a signal of frequency $f$ produced by an oscillator 3. The modulator 4 supplies the lower side-band which results from the modulation so that the frequency spectrum of the modulated signal is comprised within the range of frequencies lower than $f$, this modulated signal is applied to the second input of the switch 7. The switch 7 is controlled by a signal at half the frame frequency which is generated from the field frequency sync signals and applied to the control input 9 of the switch; the switch alternately connects the output of the filter 1 and the output of the modulator 4, to the adder 6, switching taking place at the end of each complete picture or frame (two fields) during the vertical flyback periods. The adder 6 is supplied at a second input, through the a gating circuit 5, with the output signal from the oscillator 3. The circuit 5 is controlled at input 8 by means of signals derived from the sync signal, so that bursts of the output signal from the oscillator are transmitted to the adder, during the horizontal flyback intervals, when the frequency-translated second component signal is directed to the output of switch 9.

This insertion of the bursts in the course of every other frame period may also be effected at the output of modulator 4.

At the output S, during one frame period out of two, the lower frequency components of the image signal are obtained and, during the time of the next frame period, the higher-frequency components of the image signal, which take the form of a modulated signal upon which there are superimposed, during the horizontal flyback intervals, the bursts of the reference signal at frequency $f$. In both cases, the spectrum of the transmitted signal is comprised within the range of frequencies below or equal to the frequency $f$, making it possible to effect transmission and recording of the image signal with a reduced bandwidth.

For one and the same allotted frequency band, this solution achieves an optimum compromise between, on the one hand, the production of high-definition and low frame frequency (this introduces a stroboscopic effect) images, and on the other hand, the production of images of normal frame frequency but reduced definition. In other words, on the one hand, in the cases of a fixed image, all the spectral components are reconstituted and the same definition is obtained as with the high definition system, while on the other hand, in the case of an image of an animated scene, the frame frequency is sufficient to avoid the production of the stroboscopic effect, each image differing from the preceding one by half its components.

FIG. 2 illustrates a decoding circuit which can be associated with the two pick-up heads of reproduction device.

The decoding circuit has two inputs A and A' designed to be coupled to two pick-up heads, through two frequency demodulators if recording was effected in the form of a frequency modulated wave, and an output V at which the complete image signal is delivered.

The decoding circuit comprises a double switch 20, controlled by signals received through a connection 34, which directs the signals coming from the inputs A and A' directly to a first input of an amplifier adder 24 or, through a frequency-translating modulator circuit 23, to a second input of said adder, depending upon whether said signals correspond to the lower frequency components or to the single side-band modulated higher frequency components of the image signal. The double switch may be formed by two switches, 21 and 22, controlled in opposition and connected by their inputs to the inputs A and A', and by their output to the adder 24 or the modulator 23.

The signals controlling the double switch 20 are generated by means of an auxiliary circuit which detects the bursts of the signal at frequency $f$, in order to identify that of the two inputs A and A' which is receiving the signal side-band modulated signal and accordingly connects it to the modulator circuit 23. The auxiliary circuit furthermore transmits the bursts of the signal at frequency $f$, to an oscillator 29, operating at the frequency $f$ and associated with the modulator circuit 23, in order to synchronise it with the recorded signals. The auxiliary circuit comprises two identical filters 25 and 26, with a narrow pass-band centered on the frequency $f$, respectively connected to the input A and to the input A', two identical detectors, 30 and 31, respectively connected to the filter 25 and a filter 26, and a trigger circuit 32 supplied at its two control inputs with the output signals from the detectors 30 and 31. Depending upon whether the bursts appear at one or the other of the inputs A and A', one or the other of the two detectors will supply a signal which places the trigger circuit 32 in one of its two possible states; the output voltage from the trigger circuit is transmitted by the connection 34 and controls the various switches.

The bursts are transmitted to the oscillator 29 through a switch 27 connected by its inputs to the outputs of the filters 25 and 26, and of a gating circuit 28 arranged between the output of said switch and the control input of the oscillator 29. The switch 27 is controlled by the outpuut voltage from the trigger circuit 32, while the gating circuit is controlled by the output voltage from an adder 33 connected by its two inputs to the outputs of the detectors 30 and 31. The gating circuit only transmits a signal when the output voltage from the adder exceeds a given threshold so that the oscillaor 29 is not supplied with the components of frequency $f$, or close to $f$, of the image signal, but simply with the bursts.

The invention can readily be applied to the case of the luminance signal of a colour television signal while also providing for the processing of the two chrominance signals.

FIG. 3 is a diagram illustrating at the same frequency scale, the frequency ranges allocated in this case to the spectra of the alternately transmitted signals.

For one frame period out of two, the recorded signal corresponds to the lower frequency components of the luminance signal and to one of the chrominance signals; the band of frequencies occupied by this signal (FIG. 3a) is constituted by the lower half, 52, of the band of frequencies 50 occupied by the video signal and by the band of frequencies 55 allocated to the chrominance signals.

During the next frame period, the transmitted signal corresponds to the higher frequency components of the luminance signal and to the second chrominance signal. The band of frequencies occupied by this signal (FIG. 3c) is constituted by the band 54 corresponding, by SSB frequency transposition, to the upper half, 53, of the band 50 occupied by the luminance signal, and by the band 56, identical to band 55 and now allocated to the second chrominance signal. The bandwidth required for recording is half the bandwidth occupied by the full luminance signal, increased by the bandwidth allocated to the chrominance signals. The spectrum 51 of the bursts at frequency $f$, is comprised within the band of recorded frequencies.

FIGS. 4 and 5 illustrates modifications made to the circuits of FIGS. 1 and 2, in order to make it possible to record and reproduce the chrominance signals.

The circuit shown in FIG. 4 comprises a circuit identical to the circuit of FIG. 1, whose input E is assigned to the luminance signal and the elements of which (not all of which have been shown in the drawing) operate in the same manner as before. The circuit furthermore comprises two inputs B and R assigned to two chrominance signals; the input B constitutes the modulating input of a modulator 61 whose output is coupled to a filter 63 of pass-band 56; the output signal from this filter is superimposed upon the SSB modulated signal through an amplifier-adder 65 arranged between the SSB modulator and the switch 7. The input R constitutes the modulating input of a second modulator 62 whose output supplies a filter 64 of pass-band 55. The output signal from the filter 63 is superimposed upon the lower frequency components of the luminance signal by means of an amplifier-adder 66 arranged between the output of the filter 1 and the corresponding input of the switch 7. The modulators 61 and 62 used can be of amplitude-modulation or frequency-modulation type. Of course a single modulator, alternately modulated by the two chrominance signals may also be used, and its filtered output signal applied to an input of adder 6.

The decoding circuit comprises in addition to the luminance circuit shown in FIG. 2, a chrominance circuit shown in FIG. 5. Two identical filters 71 and 72, whose pass-band corresponds to bands 55 and 56 of FIG. 3 separate the modulated chrominance signals from the luminance component signals, the latter being directed to double-switch 20 of FIG. 2, through low pass filters, not shown in the drawing. The outputs of filters 71 and 72 are connected to the two inputs of a double switch 70 identical to double switch 20, and controlled in the same way by the output 34 from the trigger circuit 32 (FIG. 2). The two output of the double switch 70 respectively feed to demodulating circuits 75 and 76.

The separation of the luminance and chrominance signals can also be effected in the outputs channels of the double switch 20 (FIG. 2) before demodulating as concerns the channel assigned to the second luminance component signal; a double switch is thus spared.

This special method of processing the image signals can be utilised in the various known recording devices. In the case of a data carrier constituted by a magnetic tape, the recording process proper is unmodified and its is only the process of reproduction which is distinguished from the conventional one in the sense that it necessitates the use of two pick-up units staggered in relation to one another by an interval corresponding to a picture; if the magnetoscope is of the helica recording type, at the rate of one field per track, the pick-up units are spaced in order to read two parallel tracks of the same parity. In the case where the data carrier is an optically-read video disc, on which the signals are recorded at the rate of one frame per revolution, the reading can be done by means of two optical detector units arranged in order to read two contiguous tracks, guidance of the head carrying the two units, along the recording tracks, being effected by means of the electro-optical device used previously to guide a single unit.

It should be pointed out that the need to utilise two pick-up units can be exploited to create a novel device for the controlled guidance of the unit head in the case of a disc reader unit, or a novel device for positional control of the magnetic tape, in the case of a magnetoscope. This kind of control operates by comparing the amplitude of frequency-modulated signals furnished by each of the units, these latter being separated by an interval differing slightly from the inter-tracks pitch, so that the relative shift of the units in relation to tracks is manifested by signals of different amplitudes at the output of each of the pick-up units.

The invention is not limited to the embodiments described here. Various embodiments of the coding circuits which are designed to record half the information relating to an image, within a reduced frequency band, and of the decoding circuits which are designed to combine the signals pertaining to two successive images, can be envisaged.

It also applies where the alternation of the two component signals is at a frequency other than the frame frequency, provided of course the two component signals successively registered, whether as such or by means of modulated signals, are read simultaneoulsy.

However, an alternation at the frame frequency is preferred because it allows a better reproduction of the transitions of the image than the field frequency and a perfect superimposition in the decoding circuit, of conventional sync signals.

Of course, the invention is not limited to the embodiments described and shown which were given solely by way of example.

What is claimed is:

1. A recording apparatus circuit for processing a television image signal before the recording thereof, said coding circuit comprising: filtering means for separating said image signal into first and second component signals respectively occupying a lower frequency band and a higher frequency band, said lower and higher frequency bands having equal widths; frequency translating means, including a modulator and an oscillator having an output, for translating said second component signal into said lower frequency band; switching means for alternately directing, each time for a duration equal to a predetermined whole number, not exceeding two, of field periods, to a single output said first component signal and the frequency translated second component signal; and means for adding bursts of the output signal from said oscillator to said frequency-translated second component signal during the horizontal fly back intervals.

2. A coding circuit as claimed in claim 1, wherein said duration is equal to a frame period.

3. A recording apparatus coding circuit for processing before the recording thereof colour television information comprising a luminance signal and first and second chrominance signals, said coding circuit comprising: filtering means for separation said luminance signal into first and second component signals respectively occupying a lower frequency band and a higher frequency band, said lower and higher frequency bands having equal widths; frequency translating means, including a modulator and an oscillator having an output, for translating said second component signal into said lower frequency band; means for adding to said first component signal a first wave modulated by said first chrominance signal and to the frequency-translated second signal a second wave modulated by said second chrominance signal, said first and second modulated waves occupying a frequency band lying higher than said lower frequency band; switching means for alternately directing to a single output, each time for a duration equal to a predetermined whole number, not exceeding two, of field periods, said first component signal together with said first wave and the frequency-translated second component signal together with said second wave; and means for adding bursts of the output signal from said oscillator to said frequency translated second component signal during the horizontal fly back intervals.

4. A coding circuit as claimed in claim 3, wherein said duration is equal to a frame period.

5. A reproducing apparatus decoding circuit for processing a television signal, referred to as an alternate signal, derived from a television image signal through separating said image signal into first and second component signals respectively occupying a lower frequency band and a higher frequency band, said lower and higher frequency band having equal widths, frequency translating said second component signal into said lower frequency band by means of a wave whose frequency is equal to the frequency translation imparted to said second component signal, said alternate signal alternately comprising, each time for a druation equal to a predetermined whole number of field periods, not exceeding two, (i) said first component signal and (ii) the frequency translated second component signal together with bursts of said wave occurring during the horizontal fly back intervals, said decoding circuit comprising: a double switch having two inputs for simultaneously receiving said alternate signal, the alternate signal applied to one of said two inputs being time-shifted by said duration relatively to the alternate signal applied to the other one of said inputs, and two outputs; means for actuating said double switch to direct said first component signal and said frequency translated second component signal to said two outputs of said double switch respectively; and frequency translating means for translating said frequency translated second component signal into said lower frequency band, said frequency translating means including a modulator an oscillator having a control input, and means for applying said bursts to said control input of said oscillator.

6. A decoding circuit as claim in claim 5, for processing an alternate signal wherein said first component signal and said frequency translated component signal alternately appear each for the duration of a frame period, wherein said actuating means comprise first and second detecting means for respectively detecting the burst included in the received alternate signals, and a trigger circuit, respectively controlling said double switch, said trigger circuit having two inputs respectively coupled to said first and second detecting means.

7. A decoding circuit as claimed in claim 5, for processing an alternate signal added with a further signal occupying a frequency band lying higher than said lower frequency band, said further signal comprising a first wave, modulated by a first chrominance signal, added to said first component signal, and a second wave modulated by a second chrominance signal, added to the frequency translated second component signal, said decoding circuit further comprising first and second demodulators, and means including filtering means, for separating said first modulated wave from said first component signal and said second modulated wave from said second component signal and directing said first and second modulated waves respectively to said first and second further demodulators.

8. A decoding circuit as claimed in claim 7, wherein said duration is equal to a frame period.

* * * * *